Nov. 16, 1926.  1,607,427
S. BOROS
TIRE FABRIC CUTTER
Filed March 26, 1926   2 Sheets-Sheet 2
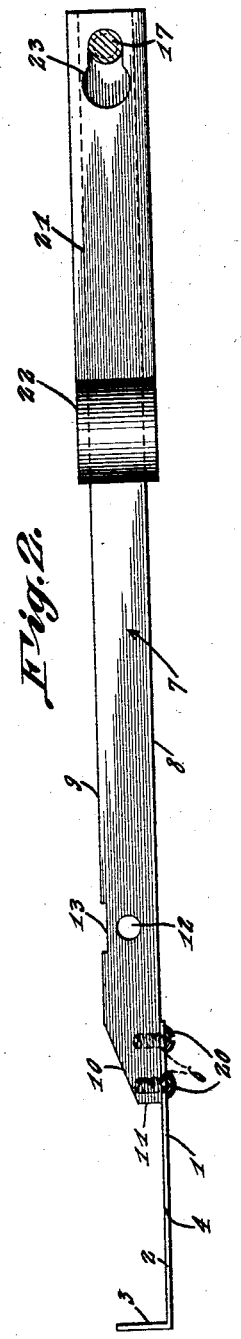
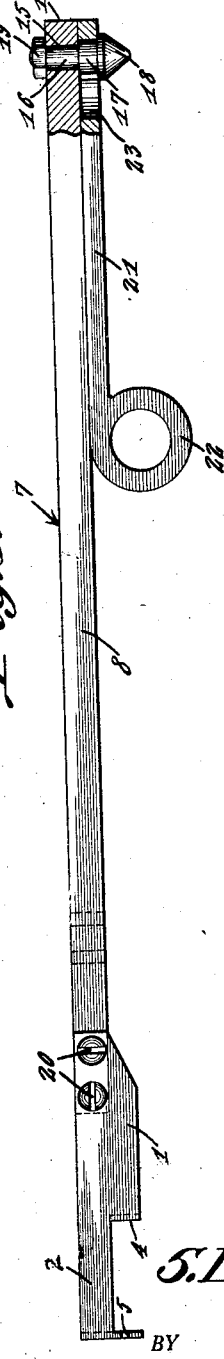
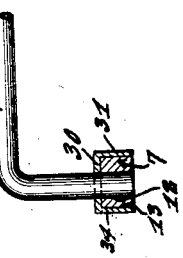
S. Boros, INVENTOR.
BY
Geo. P. Kimmel, ATTORNEY.

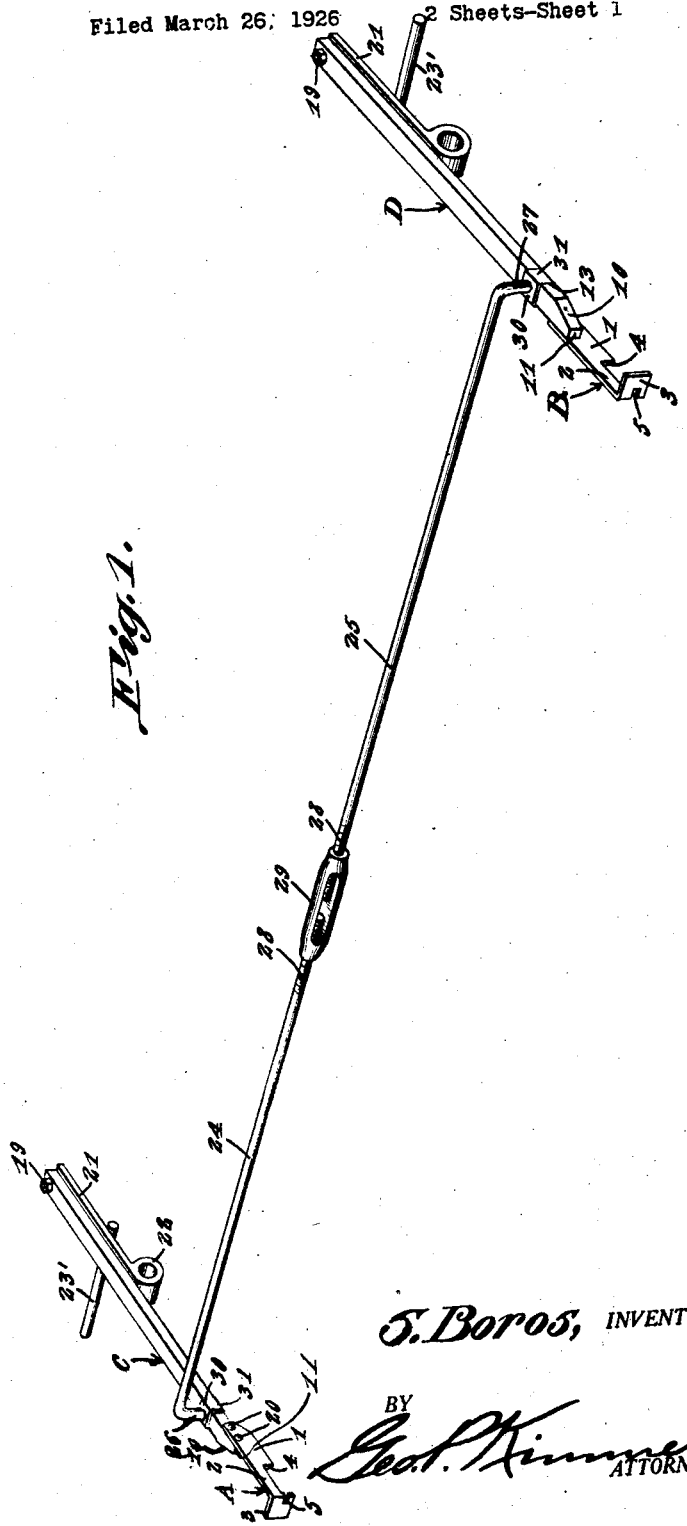

Patented Nov. 16, 1926.

1,607,427

UNITED STATES PATENT OFFICE.

STEVE BOROS, OF KENMORE, OHIO.

TIRE-FABRIC CUTTER.

Application filed March 26, 1926. Serial No. 97,796.

This invention relates to a fabric trimming device, designed primarily for use for tire fabrics, but it is to be understood that a device, in accordance with this invention, can be employed for any purpose for which it is found applicable, and the invention has for its object to provide, in a manner as hereinafter set forth, a device of the class referred to having means for trimming the opposed edges of a tire fabric as it is run through a calender to form such edges smooth as is required in the manufacture of tires.

A further object of the invention is to provide, in a manner as hereinafter set forth, a fabric trimming device having means to provide for the adjusting thereof to enable the same to be employed for trimming fabric of varying widths and further with said means acting as a brace for the carriers for the trimmers or knives.

Further objects of the invention are to provide, in a manner as hereinafter set forth, a fabric trimming device, which is simple in its construction and arrangement, strong, durable, thoroughly efficient in its use, conveniently installed with respect to a calender, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a perspective view of a fabric trimming device, in accordance with this invention.

Figure 2 is an inverted plan of a trimmer or knife, its carrier and the support for the latter.

Figure 3 is a side elevation of a trimmer or knife, its carrier and the support for the latter, and further illustrating the carrier and support partly in section.

Figure 4 is a fragmentary view of the brace element and a trimmer or knife carrier.

A fabric trimming device, in accordance with this invention comprises a pair of trimmers or knives, a carrier for each trimmer or knife and which also constitutes a guide for the selvage when severed, a brace element common to the carriers, and a support for each carrier. Each trimmer or knife is detachably secured to the inner side of its respective carrier, at the outer end thereof, and is provided with means for guiding the fabric as it passes towards the calender.

Each trimmer or knife is formed from a strip of metallic material, preferably steel, of the desired length, thickness and width and consists of an inner end portion 1, an intermediate portion 2 and an outer end portion 3, which is disposed at right angles with respect to the outer side face of the intermediate portion 2. The inner end portion 1 is of greater length and width than the intermediate portion 2, and the latter has its top edge form a continuation of the top edge of the inner end portion 1 and further is flush with the top edge of the outer end portion 3. The intermediate portion 2 is approximately half the width of the end portions 1 and 3, and the end portion 3 is of the same width as the end portion 1. The intermediate portion 2, at its rear, is integral with and forms a continuation of the upper part of the inner end portion 1 and that part of the outer end of the inner end portion 1 indicated at 4, and arranged below the intermediate portion 2 is bevelled to provide a cutting edge which opposes that portion of the inner face of the outer end portion 3, which is arranged below the intermediate portion 2. The outer end portion 3 is notched lengthwise thereof, as at 5, to provide a guide passage for the fabric. The guide passage is arranged below the bottom edge of the intermediate portion 2 and is of a length less than the length of the outer end portion 3 and opens at the inner end of the latter. The guide passage 5 extends at right angles with respect to the outer side face of the portions 1 and 2 of the trimmer or knife. By this construction, the trimmer or knife is not only provided with a cutting edge, but also with a guide for the fabric and with the cutting edge positioned inwardly with respect to and further spaced from the guide passage 5, and the latter is positioned with respect to the cutting edge intermediate the ends thereof, or in other words, the guide passage 5 is positioned a substantial distance above the bottom edge of the trimmer or knife. The inner end portion 1, at a point between its transverse center and the rear end and further between its longitudinal center and top edge is provided with a pair of spaced openings 6 and with one of the latter positioned in proximity to the rear end of the trimmer or knife. When the trimmers or knives are set up in operative position, they are oppositely disposed with respect to each other.

Each of the carriers consists of a bar 7 of the desired length, thickness and width and with the width thereof greater than the thickness, and the bar is so disposed, when in active position, that the sides 8, 9, thereof will be of less height than the width of the top and bottom thereof. The side 9, which is the outer side of the bar, at its outer end terminal is bevelled as at 10, so that the outer end 11 of the bar will be of less width than the major portion of the bar and the latter at a point adjacent the bevelled portion 10 is provided with a vertically disposed opening 12. The side 9 of the bar 7 is formed with a vertical groove 13 of a width greater than the diameter of the opening 12, and said opening 12 is disposed centrally with respect to the groove 13. The bar 7, in proximity to its rear end 14, is formed with a vertically disposed opening 15 through which extends a connecting member for detachably securing the bar to its respective support. The connecting member consists of a shank 16 formed of two different diameters and with the portion of larger diameter indicated at 17 and of less length than the portion of smaller diameter. Formed integral with the portion 17 of the shank is a tapered head 18 having the part thereof of greater diameter integral with the portion 17 and of greater diameter than the diameter of said portion 17 The portion of reduced diameter of the shank extends through the opening 15 and projects above the bar 7, and the projecting portion of the shank has threadedly engaging therewith a securing nut 19, which in connection with the portion 17 of the shank, secures the connecting member to the bar 7.

One of the trimmers or knives is referred to generally by the reference character A and the other trimmer or knife is referred to generally by the reference character B. One of the carriers is referred to generally by the reference character C and the other by the reference character D. Each trimmer or knife is secured to the inner side of its respective carrier, at the outer end of said side, or in other words, each trimmer or knife is secured to the side 8 of its respective carrier, at the outer end of said carrier, and projects outwardly therefrom, as well as depends from such side, see Figure 3. The trimmer or knife is secured to its respective carrier through the medium of a pair of hold-fast devices 20 which extend through the openings 6 and engage in the reduced outer end of the carrier. When the trimmers or knives are secured to the carriers, the top edges thereof are flush with the top of the carriers. See Figure 1.

Each of the supports consists of a flat rectangular arm 21 of the same width as the width of the carrier and each arm at its outer end is provided with a barrel 22 for connection to the calender. The rear end of the arm 21 is formed with a key-hole shaped opening 23, see Figure 2, which coacts with the connecting member for detachably securing a carrier to its respective support or arm 21. When a carrier is connected to its support, the portion 17 of the shank of the connecting member engages in the opening 23 and when moved to the reduced portion of said opening, see Figures 2 and 3, the head 18 coacts with the lower face of the arm 21 for the purpose of securing the carrier to its support. By shifting the carrier outwardly on its support, the portion 17 of enlarged diameter of the shank will pass into the larger part of the opening 23 and the carrier can then be detached from the arm 21 by lifting the carrier upwardly so that the head 18 will pass through the enlarged part of the opening 23. A supporting element 23 is secured to the calender and extends under the arm 21, intermediate the ends thereof.

The brace element, which is common to the carriers, consists of a pair of oppositely extending rods 24, 25 formed with angularly disposed and downwardly extending outer terminal portions 26, 27 respectively. The inner ends of the rods 24, 25 are peripherally threaded, as at 28, and engaging therewith is a turn buckle 29 for lengthwise adjusting the rods 24, 25 relatively to each other. Fixedly secured to the end terminal portion 26 as well as the end terminal portion 27, is an inverted yoke-shaped member 30 having its top secured to such end terminal at a point removed from the free end thereof, and the sides 31 of the yoke 30 are of a length to have their free ends flush with the free end of a terminal portion 26 or 27 of a rod 24 or 25. The end terminal portions 26, 27 of the rods 24, 25, when the brace element is mounted in position, engage in the openings 12 of the carriers and the outer sides of the yokes 30 are positioned in the grooves 13, see Figures 1 and 4. By this arrangement the rods 24 and 25 not only engage in the carriers but further are connected therewith by the yokes 30. The turn buckle 29, in connection with the threaded portions of the rods 24, 25 provides means whereby the carriers C, D, can be adjusted so that the device can be employed with fabrics of varing widths and when so adjusted securely held in such position and which maintains the trimmers or knives at equal distances from each other and securely holds the trimmers or knives in set position.

The bevelled portions of the sides 9 of the carriers C, D, act as guides or deflectors for the severed selvage, as the fabric sheet passes towards or through the calender. When the device is set up, the carriers C, D are oppositely disposed with respect to each other, and the same arrangement is had with respect to the trimmers or knives A, B. The fabric sheet is passed through the guides 5 and as it travels towards or through the calender the cutting edges will engage the same and smooth the opposed edges thereof by severing the selvage therefrom, and the latter will be guided or deflected off by the bevelled portions 10 of the edges 9.

It is thought that the many advantages of a fabric trimming device, in accordance with this invention and for the purpose set forth, can be readily understood, and although the preferred embodiment of the invention is as illustrated and described yet it is to be understood that changes in the details of construction can be had which will fall within the scope of the invention as claimed.

What I claim is:—

1. A fabric trimming device comprising a pair of spaced carriers, a bracing element common to and engaging with said carriers intermediate the ends thereof, a trimmer element secured to and projecting outwardly from the outer end edge of said carriers and provided with a vertical cutting edge and a guide, said guide arranged forwardly of and spaced from the cutting edge.

2. A fabric trimming device comprising a pair of spaced carriers, a bracing element common to and engaging with said carriers intermediate the ends thereof, a trimmer element secured to and projecting outwardly from the outer end edge of said carriers and provided with a vertical cutting edge and a guide, said guide arranged forwardly of and spaced from the cutting edge, and means for detachably connecting the carriers to supporting means therefor.

3. A fabric trimming device comprising a pair of spaced carriers, a bracing element common to and engaging with said carriers intermediate the ends thereof, a trimmer element secured to and projecting outwardly from the outer end edge of said carriers and provided with a vertical cutting edge and a guide, said guide arranged forwardly of and spaced from the cutting edge, and said trimmer element secured to the inner side of its respective carrier.

4. A fabric trimming device comprising a pair of spaced carriers, a bracing element common to and engaging with said carriers intermediate the ends thereof, a trimmer element secured to and projecting outwardly from the outer end edge of said carriers and provided with a vertical cutting edge and a guide, said guide arranged forwardly of and spaced from the cutting edge, and means carried by the rear end of a carrier for detachably connecting it to a support.

5. A fabric trimming device comprising a pair of spaced carriers, a bracing element common to and engaging with said carriers intermediate the ends thereof, a trimmer element secured to and projecting outwardly from the outer end edge of said carriers and provided with a vertical cutting edge and a guide, said guide arranged forwardly of and spaced from the cutting edge, each of said trimmer elements secured to the inner side and projecting outwardly from its respective carrier, and each of said carriers having its outer side at its forward end bevelled to provide a guide or deflector for the severed selvage.

6. In a fabric trimmer, a pair of oppositely disposed spaced trimmer elements, means for maintaining said elements in spaced relation, each of said elements having a right angularly disposed outer end portion formed in its inner portion with a guide passage opening at its inner end, and each of said elements further provided intermediate its ends with a vertically disposed cutting edge spaced from and opposing the open inner end of said passage.

7. In a fabric trimmer, a pair of oppositely disposed spaced trimmer elements, means for maintaining said elements in spaced relation, each of said elements having a right angularly disposed outer end portion formed in its inner portion with a guide passage opening at its inner end, and each of said elements further provided intermediate its ends with a vertically disposed cutting edge spaced from and opposing the open inner end of said passage, said means for maintaining said trimmer elements in opposed spaced relation adjustable to vary the distance between said elements.

8. In a fabric trimmer, a pair of carriers, a trimmer element secured to and extending outwardly from one end of each carrier, a brace element common to and extending into said carriers and provided with means for overlapping the top and sides of the carriers, and each of said elements including a guide passage and a vertically disposed cutting edge opposing and spaced from one end of said passage, said passage extending outwardly and at right angles with respect to said cutting edge.

9. In a fabric trimmer, a pair of carriers, a trimmer element secured to and extending outwardly from one end of each carrier, a brace element common to and extending into said carriers and provided with means for overlapping the top and sides of the carriers, each of said elements including a guide passage and a vertically disposed cutting edge opposing and spaced from one end of said passage, said passage extending outwardly and at right angles with respect to said cutting edge, and means at the rear end of each carrier for detachably connecting it to a supporting means therefor.

In testimony whereof, I affix my signature hereto.

STEVE BOROS.